United States Patent [19]

Kostusyk

[11] Patent Number: 4,789,402
[45] Date of Patent: Dec. 6, 1988

[54] MANNICH REACTION PRODUCT AS ASPHALT ANTISTRIPPING AGENT

[75] Inventor: Joseph L. Kostusyk, Euclid, Ohio

[73] Assignee: The Lubrizol Corporation, Wickliffe, Ohio

[21] Appl. No.: 36,636

[22] Filed: Apr. 10, 1987

[51] Int. Cl.⁴ .................. C08L 95/00; C10C 3/02
[52] U.S. Cl. ................... 106/273.1; 524/59; 208/44
[58] Field of Search ........... 525/54.5; 524/61, 59, 524/70; 106/273 N; 208/44

[56] References Cited

U.S. PATENT DOCUMENTS

| | | | |
|---|---|---|---|
| 2,759,839 | 8/1956 | Crews et al. | 106/273 |
| 3,126,350 | 3/1964 | Borgfeldt | 106/277 |
| 3,200,155 | 8/1965 | Kirkpatrick et al. | 260/584 |
| 3,615,797 | 10/1971 | Doi et al. | 106/278 |
| 3,861,933 | 1/1975 | Doi | 106/273 |
| 3,871,893 | 3/1975 | Doughty | 106/277 |
| 3,928,061 | 12/1975 | Hellster et al. | 106/273 |
| 3,933,710 | 1/1976 | Fukushi et al. | 260/28.5 |
| 3,963,509 | 6/1976 | Doi et al. | 106/273 |
| 4,430,127 | 2/1984 | Dalter et al. | 106/273 |
| 4,430,465 | 2/1984 | Abbott | 524/64 |
| 4,639,273 | 1/1987 | Gilmore et al. | 106/281 |
| 4,701,484 | 10/1987 | Chang et al. | 524/59 |

*Primary Examiner*—Paul Lieberman
*Assistant Examiner*—Christine A. Skane
*Attorney, Agent, or Firm*—Karl Bozicevic; Robert A. Franks; William C. Tritt

[57] ABSTRACT

An asphalt cement mixture is disclosed. The mixture has improved antistripping properties due to the inclusion therein of a minor amount of an antistripping agent produced by the condensation reaction of an amine, an aldehyde or aldehyde reaction synthon an alkylated phenol. The antistripping agent is preferably present in the asphalt cement in an amount of from about 0.25% to about 1% by weight based on the weight of the asphalt cement. The asphalt cement is combined with an aggregate to form a concrete and paved onto a road surface to provide a paved surface with improved durability.

21 Claims, No Drawings

MANNICH REACTION PRODUCT AS ASPHALT ANTISTRIPPING AGENT

FIELD OF THE INVENTION

This invention relates to the field of antistripping agents used in asphalt cement and concrete mixtures. More specifically, the invention relates to an asphalt cements having therein an antistripping agent in the form of a reaction product obtained by reacting together an amine, and an aldehyde or aldehyde reaction synthon, and an alkylated phenol.

BACKGROUND OF THE INVENTION

In recent years, problems relating to water damage to asphalt pavement have caused researchers to direct their attention toward a phenomena referred to as "stripping". This term is applied to asphalt pavement mixtures that exhibit separation of the asphalt concrete from the aggregate surfaces due primarily to the action of water on the asphalt over time under various environmental conditions. It should be noted that asphalt concrete generally consists of about 95% stone and about 5% asphalt cement.

Asphalt may be generally described as a dark-brown to black cementitious material, solid or semi-solid in consistency, in which the primary constituents are a mixture of paraffinic and aromatic hydrocarbons and heterocyclic compounds containing sulfur, nitrogen and oxygen. As discussed in The Asphalt Handbook (The Asphalt Institute, Manual Series No. 4, 1965 ed.), incorporated herein by reference, various grades of asphalt may be produced by selecting different processing conditions. In this regard, two basic types of solid asphalt, asphalt cement and air-blown asphalt, and two basic types of liquid asphalt, cutback asphalt and emulsified asphalt, are utilized commercially. Asphalt cement is defined as asphalt which has been refined to meet paving or industrial specifications, cutback asphalt is asphalt cement which has been liquified by blending with petroleum solvents; and asphalt emulsions are prepared such that the asphalt or flux in the emulsion base is emulsified in the inner phase (an oil-in-water type emulsion). The emulsion can also be of the water-in oil type in which water constitutes the inner phase (see Jellsten et al, "Asphalt Compositions Having Improved Adhesion To Aggregate", U.S. Pat. No. 3,928,061). The present invention is believed to be useful in connection with all such asphalts.

The particle size of mineral aggregate used in an asphalt composition may vary over a wide range, such as from $2 \times 10^{-5}$ to $6 \times 10^{-2}$ meters in diameter, or the aggregate may be of a fairly uniform size. Mineral aggregates employed in asphalt compositions also range in character from hydrophilic to hydrophobic. It has long been known that mineral aggregates have a greater attraction for water than for oil or asphalt. In general it can be said that siliceous and acidic minerals such as sands and gravels tend to be very hydrophilic whereas calcareous and alkaline materials such as limestone tend to be slightly hydrophilic. It is difficult, therefore to obtain and maintain a satisfactory asphalt coating on the mineral aggregate particles when water is present. One example of an asphalt composition is the combination of asphalt cement with a size-graded mineral aggregate. This combination is referred to as asphalt concrete and is used in road paving applications. A poor asphalt coating on the mineral aggregate leads to break up of the asphalt concrete and commonly results in potholes and pavements which are unserviceable.

One common method of pavement construction is to remove water from the aggregate by forced evaporation prior to coating with asphalt cement. In practice, this requires a certain amount of aggregate drying time which consumes energy and may result in a lengthened construction period. If weather conditions are unfavorable, such as during periods of rainfall or high humidity, road construction may be severely hindered if not halted. Even if the water is removed and the asphalt successfully deposited onto the aggregate, the asphalt coating may ultimately be degraded by the action of groundwater or rainfall.

A successful method of increasing pavement life has been to add one or more antistripping additives to the asphalt compositions. Such additives increase the hydrophobicity of the aggregate, thereby strengthening and preserving the asphalt-aggregate bond. While antistripping additives have been found to be successful in certain paving and roofing applications, conventional asphalt compositions employing such additives are still limited in that the strength of the asphalt-aggregate bond is often not sufficient to resist damage from prolonged conditions of stress and wear.

U.S. Pat. No. 4,639,273 discloses formaldehyde adducts of amines, polyamines and amides which are employed in asphalt compositions in order to improve the overall adhesion between the asphalt and aggregate.

U.S. Pat. No. 4,430,172 discloses an ethoxylated amine asphalt antistripping agent. The antistripping agent is disclosed as providing adhesion between aggregate materials and the bitumen containing material.

U.S. Pat. No. 3,963,509 discloses asphalt which is indicated as having high adhesion strength. The asphalt is prepared by incorporating into the asphalt a small amount of a monocarboxylic chromic chloride.

U.S. Pat. No. 3,933,710 discloses a latex-asphalt emulsion composition. The composition is comprised of a cationic latex prepared by the emulsion-polymerization of a diene in the presence of an emulsifier of an inorganic or organic acid salt of an N-alkylpropylene diaminepolyglycol ether.

U.S. Pat. No. 3,928,061 discloses asphalt compositions which are provided with improved adhesion to the aggregate. The compositions being comprised of an alkyl oxyalkylene amine and, optionally, an alkanolamine.

U.S. Pat. No. 3,861,933 discloses an asphalt which is indicated as having high adhesion strength. The asphalt is prepared by incorporating therein a small amount of an aminoalkyl polyalkoxysilane.

U.S. Pat. No. 4,430,465 discloses an asphalt composition which is made by mixing together asphalt and an alkadiene-vinylarene copolymer and a petroleum hydrocarbon resin and an amine-based antistripping agent.

U.S. Pat. No. 3,615,797 discloses a method of making an asphalt composition having high adhesion properties. The adhesion properties are apparently improved by the incorporation of small amounts of an ethylene oxide condensate of a long chain alkyl triamine compound.

U.S. Pat. No. 2,759,839 discloses asphalt compositions which include small amounts of an oil-soluble tertiary amine compound.

Long chain polyamine compounds per se are disclosed within numerous publications such as U.S. Pat.

No. 4,218,307 and U.S. Pat. No. 3,200,155. In addition, amine compounds obtained as a result of a MANNICH type reaction are known to be disclosed within the prior art.

SUMMARY OF THE INVENTION

The present invention relates to an asphalt concrete mixture which has improved antistripping properties. The improved antistripping properties of the asphalt are obtained by incorporating into the asphalt a small amount of a MANNICH reaction product. More specifically, the antistripping agent compound of the invention is the reaction product obtained by reacting an amine, an aldehyde or aldehyde reaction synthon and an alkylated phenol. The amine aldehyde and alkylated phenol can be reacted with each other simultaneously or alternatively the aldehyde or aldehyde reaction synthon can be reacted with the alkylated phenol to form an alkanol substituted phenol which is then reacted with the amine. This reaction product can be carried out with a number of different reactants at a variety of different reaction conditions. The reaction provides a reaction product which includes a statistical mixture of compounds which are described in detail below.

It is a primary object of this invention to provide an asphalt concrete mixture having therein a minor amount of an antistripping agent produced by the condensation reaction of an amine, an aldehyde and an alkylated phenol.

An advantage of this invention is that the antistripping agent provides improved adhesion between the asphalt concrete and the aggregate surfaces to which the asphalt is applied.

A feature of this invention is that asphalt surfaces paved with the asphalt concrete having the antistripping agent of the invention incorporated therein are less subject to deterioration caused by the stripping effects of water in combination with environmental effects.

These and other objects, advantages and features of the present invention will become apparent to those persons skilled in the art upon reading the details of the structure synthesis and usage as more fully set forth below. Reference being made to the accompanying general structural formulae forming a part hereof wherein like symbols refer to like molecular moieties throughout.

DETAILED DESCRIPTION OF THE PREFERRED EMBODIMENTS

Before the present asphalt cement mixture containing an antistripping agent and process for making as such are described, it is to be understood that this invention is not limited to the particular asphalt cements and/or concrete mixtures and antistripping agents and processes for producing such described, as such cements, concretes, agents and methods may vary. It is also to be understood that the terminology used herein is for the purpose of describing particular embodiments only, it is not intended to be limiting since the scope of the present invention would be limited only by the appended claims.

It must be noted that as used in this specification and the appended claims, the singular forms "a", "an" and "the" include plural referents unless the context clearly dictates otherwise. Thus, for example, reference to "a phenol" includes mixtures of phenols, reference to "a Mannich condensate" includes reference to mixtures of such condensates, reference to "an aldehyde" includes mixtures of aldehydes and so forth.

The present invention provides a means for improving the antistripping properties of an asphalt concrete mixture. The method comprises adding to an asphalt cement mixture a compound which is produced by reacting an amine and an aldehyde or aldehyde reaction synthon with an alkylated phenol. The reaction components may be reacted together simultaneously, or alternatively the aldehyde or aldehyde reaction synthon may be reacted with the alkylated phenol to form an alkanol substituted phenol which is then reacted with the amine.

In addition to providing a method for improving the antistripping properties of an asphalt, the invention provides an asphalt cement mixture per se as well as the combination of that mixture with an aggregate in a form for road paving, i.e. an asphalt concrete. The mixture is comprised of asphalt cement having therein the minor amounts of the antistripping agent which is produced by the condensation of the amine and an aldehyde with an alkylated phenol.

The (A) alkylated phenol; (B) aldehyde or aldehyde reaction synthon; and (C) polyamine components of the invention can be reacted together in a variety of different molar ratios. In an effort to provide some guidance on this point it is suggested that the molar ratio of (A):(B):(C) be kept within the range of (1):(1–8):(1–30) preferably (1):(1–4):(1–20) more preferably (1):(2):(8–10).

The nitrogen-containing Mannich condensation products used in connection with this invention are well known to those of skill in the art. Typically they are made by reacting at least one active hydrogen compound such as a hydrocarbon-substituted phenol having at least one hydrogen atom bonded to an aromatic carbon atom, at least one aldehyde or aldehyde reaction synthon most often formaldehyde or paraformaldehyde and at least one polyamine compound.

When the reactant component (A), (B) and (C) are all reacted together they form a statistical mixture of compounds which vary, one from the other, in small increments over a range. This statistical mixture provides the antistripping agent of the present invention. Specifically, the antistripping agent is in the form of a composition containing a statistical mixture of compounds encompassed by the general structural formula (I):

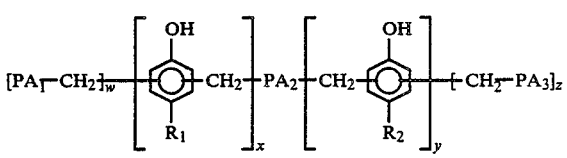

wherein $R_1$ and $R_2$ are each independently an alkyl moiety and w, x, y and z are integers and vary over a range of from 0 to 30 such that the average of w, x, y, and z is greater than 1, and $PA_1$, $PA_2$, and $PA_3$ are independently a polyamine moiety. It is understood that if any of w, x y or z is 0, the next adjoining group binds or in the case of a terminal group, hydrogen is present.

In the structural formula (I) shown above, the most preferred form of the invention is disclosed which is made by the use of formaldehyde or paraformaldehyde as the component (B) resulting in a methylene (—CH₂—) link between the alkylated phenol (A) and polyamine (C).

The (A) polyamine; (B) aldehyde or aldehyde reaction synthon; and (C) alkylated phenol reactant components of the invention will now each be described in detail.

POLYAMINES

Most preferably the amine used in connection with the present invention is bis(hexamethylene)triamine (BHMT). However, the invention encompasses the use of one or more polyamines represented by general structural formula (II).

$$NH_2-(R_3)_a-[NH-R_4]_b-NH_2 \qquad (II)$$

wherein N is nitrogen, $R_3$ and $R_4$ are each independently an alkyl moiety and a and b are independently integers in the range of from 1 to 10.

Some examples of useful alkylene polyamine include ethylene diamine, triethylene tetramine, propylene diamine, trimethylene diamine, hexamethylene diamine, decamethylene diamine, octamethylene diamine, di(heptamethylene)triamine, tripropylene tetramine, tetraethylene pentamine, trimethylene diamine, pentaethylene hexamine, di(trimethylene)triamine, N-(2-aminoethyl)piperazine, 1,4-bis(2-aminoethyl)piperazine, and the like. Higher homologs can be obtained by condensing two or more alkylene amines or two or more of any of the aforedescribed polyamines.

The amino compound can also be an aromatic polyamine such as the phenylene and napthylene diamines or hydrazines such as hydrazine itself and organohydrazines having hydrocarbon-based substituents of up to about 30 carbon atoms.

It is of course possible to describe the amine reactant component in a number of different ways. This component can include (1) polyalkylene polyamines of the general formula:

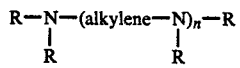

wherein each R is independently a hydrogen atom or a $C_{1-12}$ hydrocarbon based group, with the proviso that at least one R is a hydrogen atom, n is a whole number of 1 to 10 and alkylene is a $C_{1-10}$ alkylene group, (2) heterocyclic-substituted polyamines of the formula:

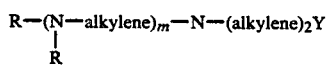

wherein R and alkylene are as defined hereinabove, m is 0 or a whole number of 1 to 10, and Y is an oxygen or divalent sulfur atom or N-R* and R* is either an R or a

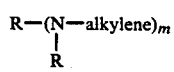

group and (3) aromatic polyamines of the general formula

Ar(NR₂)ᵧ wherein Ar is an aromatic nucleus (usually hydrocarbyl in nature) of 6 to about 20 carbon atoms, each R is as defined hereinabove and y is 2 to about 8. Exemplary of the polyalkylene polyamines (1) are ethylene diamine, tetra(ethylene)pentamine, tri-(trimethylene)tetramine, 1,2-propylene diamine, etc. Exemplary of the heterocyclic-substituted polyamines (2) are N-2 aminoethyl piperazine, N-2 and N-3-aminopropyl morpholine, N-3-(dimethyl amino)propyl piperazine, etc. Exemplary of the aromatic polyamines (3) are the various isomeric phenylene diamines, the various isomeric naphtylene diamines, etc.

ALDEHYDES OR ALDEHYDE REACTION SYNTONS

Formaldehyde and paraformaldehyde are most preferably used as this reactant component. However, the invention encompasses the use of one or more aldehyde or aldehyde reaction synthons encompassed by the general structural formula (III):

wherein R is an alkyl moiety.

Useful aldehydes include the following: Formaldehyde, acetaldehyde, propionaldehyde, n-butyraldehyde, n-valeraldehyde, caproaldehyde, heptaldehyde, phenylacetaldehyde, benzaldehyde, o-tolualdehyde, tolualdehyde, p-tolualdehyde, salicylaldehyde (o-hydroxybenzaldehyde) p-hydroxybenzaldehyde and anisaldehyde.

ALKYLATED PHENOLS

Most preferably the alkylated phenol used in connection with the present inventing is a phenol having a 9 to 15 carbon chain alkyl moiety connected to the benzene ring at a position para to the OH group. However, the invention encompasses the use of one or more alkylated phenols represented by the following general structural formula (IV):

R' may be hydrogen or be defined in the same manner as R, wherein R is any hydrocarbyl connected para, meta or ortho with respect to the OH group.

As used herein, the term "hydrocarbyl" denotes a radical having a carbon atom directly attached to the remainder of the molecule and having predominantly hydrocarbon character within the context of this invention. Such radicals include the following:

(1) Hydrocarbon radicals; that is, aliphatic, (e.g., alkyl or alkenyl), alicyclic (e.g., cycloalkyl or cycloalkenyl), aromatic, aliphatic and alicyclic-substituted aromatic, aromatic-substituted aliphatic and alicyclic radicals, and the like, as well as cyclic radicals wherein the ring is completed through another portion of the molecule (that is, any two indicated substituents may together from an alicyclic radical). Such radicals are known to those skilled in the art; examples are (2) Substituted hydrocarbon radicals; that is, radicals containing non-hydrocarbon substituents which, in the context of this invention, do not alter the predominantly hydrocarbon character of the radical. Those skilled in the art will be aware of suitable substituents; examples are (3) Hetero radicals; that is, radicals which, while predominantly hydrocarbon in character within the context of this invention, contain atoms other than carbon present in a chain or ring otherwise composed of carbon atoms. Suitable hetero atoms will be apparent to those skilled in the art and include, for example, nitrogen, oxygen and sulfur.

In general, no more than about three substituents or hereto atoms, and preferably no more than one, will be present for each 10 carbon atoms in the hydrocarbyl radical.

Terms such as "alkyl-based radical", "aryl-based radical" and the like have meaning analogous to the above with respect to alkyl and aryl radicals and the like.

Preferably, the hydrocarbyl radicals in the compounds of this invention are free from acetylenic and usually also from ethylenic unsaturation and have about at least one carbon atom. The radicals are usually hydrocarbon and especially lower hydrocarbon, the word "lower" denoting radicals containing up to seven carbon atoms. They are preferably lower alkyl or aryl radicals, most often alkyl.

Mannich condensates disclosed in a number of U.S. patents could be used in connection with the present invention. For example, the Mannich condensates disclosed in U.S. Pat. No. 4,090,855 (incorporated herein by reference to disclose such compounds and methods for making them which might be used in connection with the present invention). Further, other U.S. patents cited in U.S. Pat. No. 4,090,855 disclose such compounds and methods.

The following examples are provided so as to provide those of ordinary skill in the art with a complete disclosure and description of how to make the compounds and compositions of the invention and are not intended to limit the scope of what the inventors regard as their invention. Efforts have been made to insure accuracy with respect to numbers used (e.g. amounts, temperature, etc.) but some experimental errors and deviation should be accounted for. Unless indicated otherwise, parts are parts by weight, temperature is in degrees C., and pressure is at or near atmospheric.

EXAMPLE A

Charge a three necked, 500 ml round bottomed flask equipped with a heating mantle, overhead stirrer, water, condenser, nitrogen gas sparge tube and thermowell, with 67 gms of an alkylated phenol, 15 gms of paraformaldehyde, 190 gms BHMT and 7 gms water. Slowly heat the mixture and maintain at 90° C. until the paraformaldehyde has depolymerized and gone into solution. Raise the reaction mixture temperature to 150° C. and hold for three hours while removing the added water and water of reaction. The resulting product is a liquid at ambient temperatures, which should lie obtained in a yield of about 92% of theoretical, 240 gms. The product should have a base value of 472 and be 13.7% N by weight.

EXAMPLE B

Charge 268 gms of an alkylated phenol into a three necked, one liter round bottomed flask. Add 60 gms of paraformaldehyde and a catalytic amount of aqueous NaOH. Warm the reaction mixture and hold at 90° C. for one hour. Add 258 gms of aminopropyl piperazine over five minutes, and raise the reaction mixture temperature to 150° C. to remove the added water and water of reaction. The final product should be a liquid at ambient temperatures and be obtained in about a 95% of theoretical yield. The product should have a base value of 330.

EXAMPLE C

Charge a suitable reaction vessel with about 10 moles of an alkylated phenol and about 20 moles of formaldehyde added in the form of paraformaldehyde and about 90 moles of a mixture of polyamines. Slowly heat the mixture and maintain at a temperature in the range of from about 70° C. to about 95° C. until the paraformaldehyde has depolymerized and gone into solution. Raise the reaction mixture temperature to a temperature in the range of from about 100° C. to about 160° C. and maintain that temperature while removing any water. The resulting product should be a liquid at ambient temperatures, and should provide a yield of about 85% to 98% of theoretical.

EXAMPLE D

Charge a suitable reaction vessel with about 10 moles of an alkylated phenol about 40 moles of formaldehyde and about 200 moles of (BHMT) in an aqueous solution. Heat the reaction mixture to a temperature in the range of from about 90° C. to about 150° C. and maintain that temperature while removing the added water and water of reaction. The resulting product should be a liquid at ambient temperatures, and should provide a yield of about 90% to 95% of theoretical.

Various Mannich condensated disclosed in the following U.S. patents might be used in connection with the present invention:

| U.S. PAT. NOS. | | |
| --- | --- | --- |
| 2,459,112 | 3,413,347 | 3,558,743 |
| 2,962,442 | 3,442,808 | 3,586,629 |
| 2,984,550 | 3,448,047 | 3,591,598 |
| 3,036,003 | 3,454,497 | 3,600,372 |
| 3,166,516 | 3,459,497 | 3,649,229 |
| 3,236,770 | 3,461,172 | 3,654,515 |
| 3,355,270 | 3,493,520 | 3,697,574 |
| 3,368,972 | 3,539,633 | 4,090,854 |

These patents are incorporated herein by reference for their disclosures relating to Mannich condensates products and methods of making them.

EXAMPLES 1-4

Add the condensation reaction product obtained by all or any of Examples A, B, C, or D to an asphalt cement in an amount of about 0.1% to about 5% by weight based on the weight of the asphalt. The product obtained from Example A-D is more preferable added in an amount of about 0.25% to 1% and most preferable about 0.5% by weight based on the weight of the asphalt cement.

The instant invention is shown and described herein in what is considered to be the most practical, and preferred, embodiments. It is recognized, however, that departures may be made therefrom which are within the scope of the invention, and that obvious modifications will occur to one skilled in the art upon reading this disclosure.

I claim:

1. A method for improving antistripping properties of an asphalt comprising adding to the asphalt in an amount in the range of about 0.1% to about 5% by weight based on the weight of the asphalt, a compound produced by reacting (A) an amine, (B) an aldehyde or aldehyde reaction synthon, and (C) an alkylated phenol wherein the molar ratio of (A):(B):(C) is in the range of (1):(1–8):(1–30).

2. The method as claimed in claim 1, wherein the reacting is carried out stepwise by first reacting the aldehyde or aldehyde reaction synthon with the alkylated phenol and obtaining a reaction product which is reacted with the amine.

3. The method as claimed in claim 1, wherein the aldehyde reaction synthon is paraformaldehyde and, the asphalt is an asphalt cement.

4. The method as claimed in claim 1, wherein the alkylated phenol is alkylated at the para position with an alkyl moiety containing 1 to 100 carbon atoms.

5. The method as claimed in claim 4, wherein the amime is an alkyl substituted polyamine and the alkyl moiety on the alkylated phenol contains 1 to 30 carbon atoms.

6. The method as claimed in claim 5, wherein the alkyl moiety on the alkylated phenol is a polypropylene moiety containing 9 to 15 carbon atoms and the amine is bis(hexamethylene)triamine.

7. An asphalt cement mixture having therein from about 0.1% to about 5% by weight of an antistripping agent based on the weight of the asphalt cement, wherein said antistripping agent is produced by the condensation reaction of (A) an amine, (B) an aldehyde or aldehyde reaction synthon, and (C) an alkylated phenol wherein the molar ratio of (A):(B):(C) is in the range of (1):(1–8):(1–30).

8. The asphalt as claimed in claim 7, wherein the aldehyde is paraformaldehyde and the alkylated phenol is alkylated with an alkyl moiety containing 1 to 100 carbon atoms.

9. The asphalt as claimed in claim 8 wherein the alkyl moiety is a polypropylene moiety containing 9 to 15 carbon atoms and the amine is bis(hexamethylene)triamine.

10. The asphalt as claimed in claim 7, wherein the amine is bis(hexamethylene)triamine and the alkylated phenol is a polypropylene substituted phenol and the aldehyde synthon is paraformaldehyde.

11. The asphalt as claimed in claim 10, wherein the polypropylene substituent contains 9 to 15 carbon atoms and the antistripping agent is present in an amount of from about 0.25% to 1% by weight based on the weight of the asphalt cement.

12. An asphalt cement mixture comprised of a major amount of asphalt cement and from about 0.1% to about 5% by weight of an antistripping agent based on the weight of the asphalt cement, wherein said antistripping agent is in the form of a composition containing a statistical mixture of compounds encompassed by the general structural formula (I):

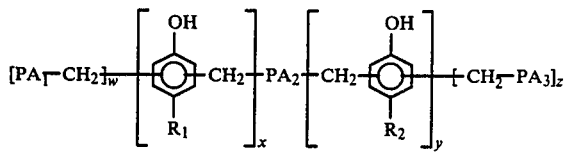

wherein $R_1$ and $R_2$ are each independently an alkyl moiety and w, x, y and z are integers and vary over a range of from 0 to 30 such that the average of w, x, y, and z is greater than 1, and $PA_1$, $PA_2$, and $PA_3$ are independently a polyamine moiety it being understood that if any of w, x y or z is 0, the next adjoining group binds or in the case of a terminal group, hydrogen is present.

13. The asphalt as claimed in claim 12, wherein each polyamine $PA_1$ $PA_2$ and $PA_3$ is represented by the general structural formula (II):

$$NH_2-(R_3)_a-[NH-R_4]_b-NH_2 \qquad (II)$$

wherein N is nitrogen, $R_3$ and $R_4$ are each independently an alkyl moiety and a and b are independently integers in the range of from 1 to 10.

14. The asphalt as claimed in claim 12, wherein a and b are each 1 and $R_3$ and $R_4$ are independently each an alkyl moiety containing 3 to 9 carbons.

15. The asphalt as claimed in claim 12, wherein each polyamine moiety is derived from bis(hexamethylene)-triamine.

16. The asphalt as claimed in claim 15, wherein each alkyl moiety is derived from polypropylene.

17. The asphalt as claimed in claim 16, wherein the antistripping agent is present in an amount of from about 0.25% to about 1% by weight based on the weight of the asphalt cement.

18. The method as claimed in claim 1, wherein the ratio of (A):(B):(C) is in the range of (1):(1–4):(1–20).

19. The method as claimed in claim 18, wherein the ratio of (A):(B):(C) is in the range of (1):(2):(8–10).

20. An asphalt cement mixture as claimed in claim 7, wherein the ratio of (A):(B):(C) is in the range of (1):(1–4):(1–20).

21. An asphalt cement mixture as claimed in claim 20, wherein the ratio of (A):(B):(C) is in the range of (1):(2):(8–10).

* * * * *